United States Patent [19]

Davis

[11] Patent Number: 6,016,861
[45] Date of Patent: Jan. 25, 2000

[54] SCREEN ASSEMBLY FOR THE REAR WINDOW OF A VEHICLE

[76] Inventor: Steven Davis, 135 SE. 61st St., Trenton, Mo. 64683

[21] Appl. No.: 09/148,058

[22] Filed: Sep. 4, 1998

[51] Int. Cl.[7] .......................................................... B60J 1/18
[52] U.S. Cl. ............................................... 160/105; 160/90
[58] Field of Search ......................... 160/105, 90, 370.21, 160/DIG. 2, DIG. 3; 296/146.1, 190.1, 190.11

[56] References Cited

U.S. PATENT DOCUMENTS

| | | |
|---|---|---|
| 2,643,711 | 6/1953 | Smith . |
| 4,124,054 | 11/1978 | Spretnjak ..................... 160/90 |
| 4,285,383 | 8/1981 | Steenburgh . |
| 4,936,368 | 6/1990 | Philbeck et al. . |
| 5,192,112 | 3/1993 | Gherardi et al. ................. 160/90 X |
| 5,228,740 | 7/1993 | Saltzman ................ 296/146.1 |
| 5,299,616 | 4/1994 | Sholtz . |
| 5,419,605 | 5/1995 | Puaatuua . |
| 5,469,906 | 11/1995 | Cason . |
| 5,799,449 | 9/1998 | Lyons et al. .................. 296/146.1 X |

*Primary Examiner*—David M. Purol
*Attorney, Agent, or Firm*—Kenneth L. Tolar

[57] ABSTRACT

A screen assembly for a rear vehicle window includes a screen track mechanism mounted to the existing window track assembly in which one or more windows are slidably received. A screen is slidably received within the screen track mechanism. When the windows are slid to an open position, the screen may be conveniently slid to cover the opening to prevent debris from entering the passenger compartment. Alternative embodiments include a pair of screens which may be selectively joined and a screen which may be joined to the side of a movable window to interchangeably move the window or screen to cover the opening.

5 Claims, 2 Drawing Sheets

SCREEN ASSEMBLY FOR THE REAR WINDOW OF A VEHICLE

BACKGROUND OF THE INVENTION

The present invention relates to a window screen assembly specifically designed for sliding rear windows such as those found on pickup trucks and similar vehicles.

DESCRIPTION OF THE PRIOR ART

Various vehicles such as pickup trucks include numerous variations of slidable rear cab windows. When such windows are open, debris, insects and similar contaminants can easily enter the passenger compartment. Furthermore, a vehicle passenger often must access items in the truck bed while riding in the passenger compartment. Although several screen assemblies for vehicles exist in the prior art, most are either fixed within the opening or cumbersome to remove therefrom. The present invention provides a unique screen assembly that allows a user to laterally slide the screen between an open and a closed position.

The prior art includes a number of screens for vehicle windows. For example, U.S. Pat. No. 5,299,616 issued to Sholtz discloses a screen specifically designed for hingedly connected vehicle windows. The screen includes an aperture through which the window arm mechanism protrudes allowing a user to pivotably open the window independently of the screen.

U.S. Pat. No. 4,285,383 issued to Steenburgh relates to a foldable, telescoping screen assembly for a vehicle side window. The frame includes protrusions that seat within the vehicle window grooves to attach the screen assembly to the vehicle.

U.S. Pat. No. 2,643,711 issued to Smith relates to a screen assembly for vehicles that rests on the upper edge of a vertically movable vehicle window. An apron is disposed at the lower edge of the screen that abuts the exterior of the vehicle.

U.S. Pat. No. 5,469,906 issued to Cason discloses a screen assembly designed for slidably openable rear windows. The device includes a screen and surrounding frame having springs mounted within a side thereof allowing the frame to compress slightly to assist a user in installing or removing the screen from the existing window track mechanism.

U.S. Pat. No. 4,936,368 issued to Philbeck et al also discloses a screen fixedly mounted over the open portion formed between a pair of a slidable rear windows on a vehicle. The screen includes a frame having upper and lower rails each having an edge portion that engage the tracks within which the windows slide. Each edge further includes a shoulder that engages the free end of the window sealing strip.

U.S. Pat. No. 5,419,605 issued to Puaatuua discloses a decorative insert for a vehicle sliding rear window.

The above referenced window screens have numerous disadvantages. Each of the screen assemblies for rear slidable windows are fixedly mounted preventing a passenger from conveniently accessing items stored in the truck bed when the screen is installed. Furthermore, when use of the screen is not desired, it cannot be conveniently removed or remotely stored. The present invention provides a screen assembly designed for several differently configured sliding rear windows that allows the screen to be quickly and conveniently moved away from the window opening when the screen is not needed.

SUMMARY OF THE INVENTION

The present invention relates to a screen assembly for vehicle rear windows in which one or more screens slide independently of the slidable windows allowing a user to easily move the screen between open and closed positions. First and second embodiments include a track mechanism mounted to the existing dual track mechanism found on certain vehicles. Either one or two screens are slidably received within the mounted track mechanism for selectively covering the opening formed when one or more of the movable windows are opened. An alternate embodiment includes a screen member slidably received within the identical track as the slidable window and may be attached thereto to interchangeably move the screen and window over the window opening. It is therefore an object of the present invention to provide a screen for the rear window of a vehicle that may be quickly and easily moved between an open and closed position.

It is yet another object of the present invention to provide a screen for the rear window of a vehicle that may be stored adjacent the window opening when not in use.

It is yet another object of the present invention to provide a screen for the rear window of a vehicle the does not diminish the vehicle's appearance.

Other objects, features and advantages of the present invention will become readily apparent from the following detailed description of the preferred embodiment when considered with the attached drawings and the appended claims.

DESCRIPTION OF THE PREFERRED EMBODIMENT

Figure 1:
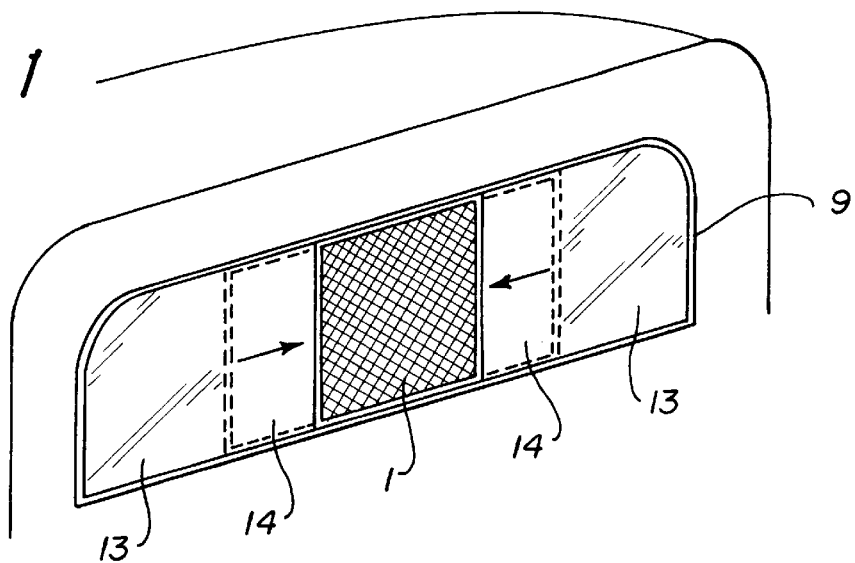
FIG. 1 depicts a perspective view of a first embodiment according to the present invention with the screen member in a closed position.
Figure 2:
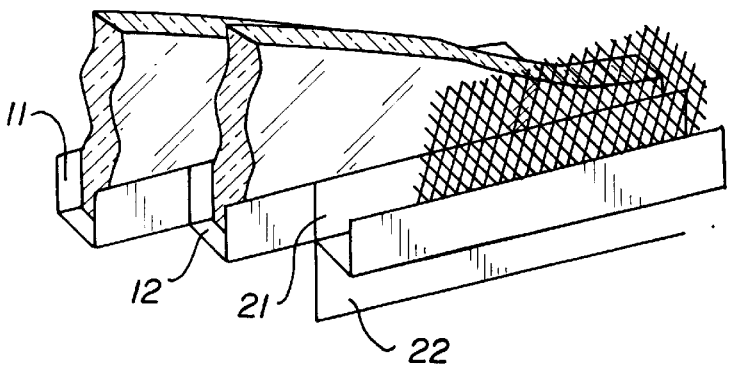
FIG. 2 is a perspective view of the various track mechanisms according to the first embodiment.
Figure 3:
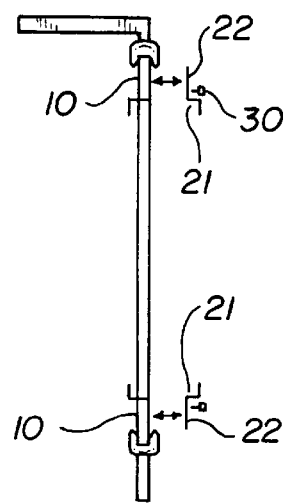
FIG. 3 depicts a cross-sectional side view of the base frame of the first and second embodiments.

Referring now to FIGS. 1 through 6, the present invention relates to a slidable screen assembly for a vehicle. The invention is designed to be used in conjunction with a conventional sliding rear window assembly, such as those commonly found on pickup trucks and similar vehicles. A conventional sliding rear window comprises a substantially rectangular border 10 including front 11 and rear 12 track mechanisms. Each track mechanism includes an upper and lower channel. Received within the upper and lower channels of the rear track are a pair of spaced, stationary window panels 13. The space between the stationary windows defines a central opening 15. In certain vehicles, a pair of movable windows 14 are slidably received within the upper and lower channels of the front track mechanism which may be moved towards and away from each other to expose or cover the opening. In others, a single movable window 30 is slidably received within the upper and lower channels of the front track mechanism which may be moved towards and away from a stationary window to expose or cover the opening. The present invention provides a screen assembly designed for conventional vehicle window assemblies as described above.

A first embodiment of the present invention includes a screen assembly comprising a base frame 9 with a peripheral configuration substantially similar to that of the window border 10. The base frame includes a third track mechanism 21 having an upper and a lower channel with a screen member slidably received therein. Extending from the upper and lower channels is a flange 22 for receiving screws or a similar fastener means 32 for securely attaching the base frame 9 to the window border 10. A substantially rectangular screen member 1 is slidably received within the third track mechanism which may be laterally slid in either of two directions. The screen member includes a substantially rectangular sheet of screen material having a peripheral frame. Once the screen assembly is installed, a user may slide the movable window or windows to a position covering the opening. Alternatively, the windows may be separated and the screen may be slid over the opening to provide an air permeable barrier that prevents debris from entering the passenger cab. If the user wishes to access items in the truck bed, the screen may be easily slid towards either side.

Figure 4:
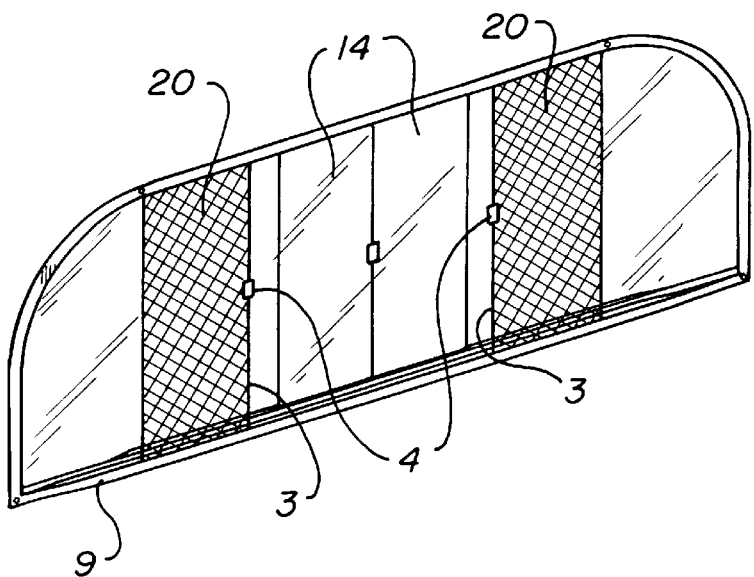
FIG. 4 depicts a perspective view of the second embodiment of the invention with the screen members in an open position.

A second embodiment of the present invention is depicted in FIG. 4 and comprises a pair of screen members 20 received within the upper and lower channels of the third track mechanism. Each screen member 20 includes a peripheral frame member having an inner side 3, an opposing outer side, and horizontal top and bottom portions, and front and rear surfaces. Attached to the front surface of the inner side of each frame is a latch means 4 for securely joining the screen members over the window opening.

Figure 5:
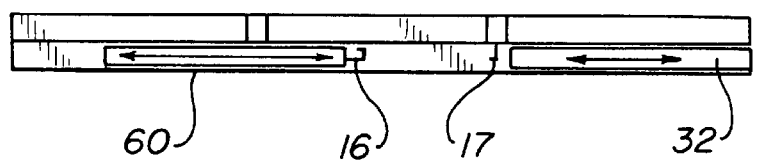
FIG. 5 depicts a top view of the third embodiment of the invention with the screen member in an open position and the window in a partially opened position.
Figure 6:
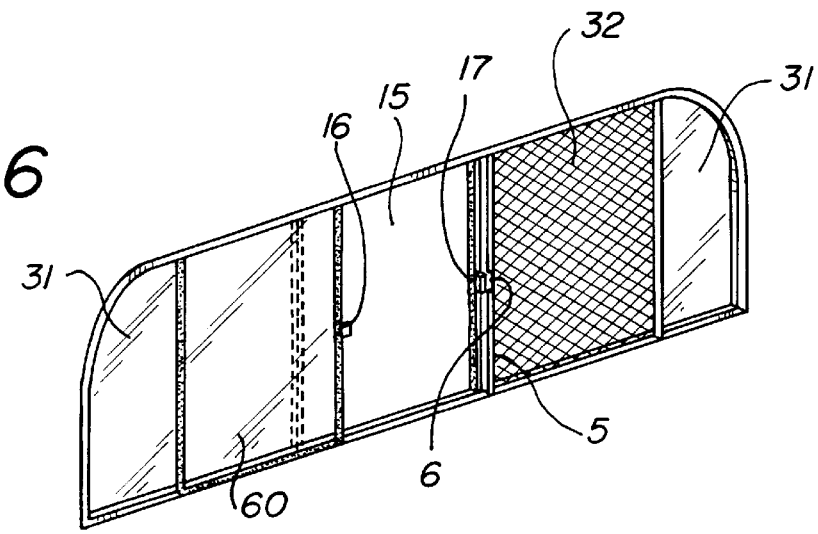
FIG. 6 depicts a perspective view of a third embodiment of the invention.

Referring now to FIGS. 5 and 6, a third embodiment is depicted for use in combination with rear windows having a single sliding window which eliminates the need for a base frame. In such rear windows, a movable window 30 is slidably received within the front track mechanism to selectively cover the opening between two spaced, stationary window panels 31 disposed within the rear track mechanism. The front and rear track mechanisms are similar to those described above. An inner side edge of a first stationary window panel has a latch means 17 thereon for matably engaging a latch means 16 on an inner side edge of the movable window 30 to secure the movable window 30 in a closed position.

A screen assembly designed for the above described rear window comprises a substantially rectangular screen member 32 having an inner side 5, an outer side, and top and bottom portions. The top and bottom portions of the screen member are slidably received within the upper and lower channels respectively of the front track mechanism.

The inner side of the screen member has a substantially centrally disposed indention 6 dimensioned such that the inner side of the screen does not engage the latch means 17 on the stationary window when the screen is slid therepast.

In addition, the inner side of the screen frame may be secured to the inner side edge of the movable window, allowing the screen and window to cooperatively and laterally move as a single unit. Accordingly, the screen and window may be interchangeably placed over the opening by sliding the unit towards either of the stationary windows. The screen may be attached to the movable window using any conventional attachment means such as a latch similar to the latch used to secure the movable window unit in a closed position. However, Velcro®, screws, bolts or similar means may also be used.

The screen frames in any of the above described embodiments are preferably made of a durable plastic with sufficient flexibility to allow the frame to be flexed slightly when installing or removing the screens. Alternatively, the frames could include springs that allow the frame to be slightly compressed to assist in installing or removing the screen members from their respective track assemblies. However, as will be readily apparent to those skilled in the art, the size, shape and materials of construction may be further varied without departing from the spirit of the present invention.

Further, the above described device is not to be limited to the exact details of construction enumerated above. For example, a base frame according to the first and second embodiments could be attached inside the vehicle adjacent to the front track assembly 11 to provide single or dual inside sliding screens. Also, a screen member may be permanently or removably mounted over the central opening with screws, double-stick tape, hook and loop fasteners, or other attachment means.

Although there has been shown and described the preferred embodiments of the present invention, it will be readily apparent to those skilled in the art that modifications may be made thereto which do not exceed the scope of the appended claims. Therefore, the scope of the invention is only to be limited by the following claims.

What is claimed is:

1. In combination with a vehicle rear window assembly having first and second tracks, a pair of spaced, stationary windows mounted within said first track, the space between which defines an opening in communication with a passenger compartment, and at least one movable window slidably received within the second track, said window slidable in either of two lateral directions to selectively cover said opening, a window screen assembly comprising:

a third track having a flange extending therefrom, said flange secured to one of said window tracks;

a screen assembly dimensioned to substantially cover said opening between said stationary windows, said screen slidably received within said third track and movable independently of said movable windows to selectively cover said opening;

said screen assembly including first and second screen members slidably received within said third track, said first and second screen members slidable towards and away from each other to selectively cover said opening;

said screen members each having an inner side with a latch means thereon to selectively join said first and second screen members.

2. In combination with a vehicle rear window assembly having a first track with a pair of spaced, stationary windows received therein, the space between said windows defining an opening, and a movable window slidably received within a second track for selectively covering said opening, said movable window having a latch means on an inner side thereof for matably engaging a latch means on one of said stationary windows, a screen assembly comprising:

a screen member slidably received within said second track, said screen member slidable between a closed position wherein said screen is covering said opening and an open position wherein said screen is disposed adjacent thereto.

3. A device according to claim 2 wherein said screen member includes an inner side with a notch thereon preventing said screen member from engaging said latch means on said stationary window as said screen member is slid therepast.

4. A device according to claim 3 wherein said inner side of said screen member is attached to the inner side of said movable window forming a single unit which can be slid in either of two directions to interchangeably place said screen member and said movable window over said opening.

5. A device according to claim 3 wherein said screen member includes a spring biased compressible border that allows the border to be compressed slightly to assist a user in removing and installing said screen member.

* * * * *